Patented Mar. 15, 1938

2,111,058

UNITED STATES PATENT OFFICE 2,111,058

SHEET MATERIAL

Herbert A. Winkelmann, Chicago, Ill., assignor to Marbon Corporation, Chicago, Ill., a corporation of Delaware No Drawing. Application September 8, 1936, Serial No. 99,878

6 Claims. (Cl. 91—70)

This invention relates to sheet material and to a method for its preparation. More particularly it relates to porous paper impregnated with rubber hydrochloride and having a high gloss surface layer of rubber hydrochloride.

In accordance with my invention paper sheets are impregnated with a mixture of rubber hydrochloride and a basic heat stabilizer dispersed in a volatile solvent. The solvent is evaporated and the sheet subjected to heat and pressure sufficient to flow the rubber hydrochloride. Highly polished hot mold plates or calender rolls are suitable for this purpose. The resulting sheet has a high gloss surface film of rubber hydrochloride and an interior portion containing rubber hydrochloride which has flowed together into and around the fibres of the paper. Depending on the amount of rubber hydrochloride, the degree of heat and pressure, and the closeness of the index of refraction of the fibre to the rubber hydrochloride there is obtained a sheet which is transparent, semi-transparent or opaque. For producing a transparent sheet a highly porous sheet having fibres of the same index of refraction as rubber hydrochloride is chosen, the sheet saturated with a concentrated solution of rubber hydrochloride, and the dried impregnated sheet subjected to sufficient heat and pressure to flow the rubber hydrochloride into a homogeneous mass throughout the sheet. For most purposes, however, high transparency is not necessary, in which case the sheet need not be saturated with a concentrated solution of rubber hydrochloride and the calendering or molding operation may be only such as to obtain a homogeneous surface glaze free from pin holes.

The invention is particularly applicable to the production of wrapping sheets, bags and center spots on bottle caps. For these uses the preferred porous material is a strong, thin, flexible paper such as kraft paper. Stabilized rubber hydrochloride impregnated and hot pressed kraft papers retain their strength over long period of time. The sheets are free from pin holes, are oil and water resistant, and may be sealed by heat and pressure alone. Other types of porous paper, including tissue paper, may also be impregnated with stabilized rubber hydrochloride and hot pressed into sheets.

The superiority of rubber hydrochlorides over plastic and resinous material for the purposes of my invention has been discovered through experimentation. The low flow point of rubber hydrochlorides, and particularly the amorphous asymmetrical rubber hydrochlorides, makes possible the homogeneous flowing of the rubber hydrochlorides throughout the paper without damage to the fibre. These heat and pressure flowed or fluxed impregnated products are free from pin holes and have been found to be more moisture vapor resistant than impregnated products which have not been given such heat and pressure treatment. A further advantage of rubber hydrochloride composite product is that unlike composite products containing thermosetting resins and high flow resins, the composite products containing rubber hydrochloride are readily heat sealable. The composite products of my invention are also highly resistant to acids, carbon dioxide, bleaching solutions, water, oils. Another advantage is that, unlike most resins and plastics, rubber hydrochloride even in its unplasticized state can impregnate thin porous, flexible paper sheets without greatly impairing the flexibility, particularly when the sheet is hot pressed after impregnation.

All types of rubber hydrochlorides may be used. The amorphous, asymmetrical rubber hydrochloride, being readily soluble in cold benzol, toluol, or the like may be used in cold solutions to impregnate the paper whereas the crystalline type saturated rubber hydrochlorides must be applied in hot solution. The amorphous type product is also less oil resistant and of lower flow point than the crystalline products with the consequent advantages and disadvantages. For high flexibility, toughness, oil, water, all round resistance to chemicals, and high flow point the rubber hydrochlorides obtained by reacting solid undissolved rubber with gaseous hydrogen chloride, particularly at elevated temperature, are preferred.

The rubber hydrochlorides may be used alone or with stabilizers, resins, fillers etc. Heat stabilizers with the rubber hydrochloride are practically essential not only to prevent the slow evolution of acid at room temperature but to prevent such evolution during the hot molding or calendering operation. Heat stabilizers such as described in the patent to Winkelmann #2,046,986 are suitable, among them being magnesium oxide, magnesium carbonate, calcium oxide, sodium stearate, litharge, and hexamethylene tetramine, the latter also acting as a light stabilizer.

Resins may be also added to the rubber hydrochloride. Compatible resins which have been found of value are chlorinated diphenyls, polycumarons, rosin, ester gums. The soft compatible resins are plasticizers, the hard resins are homogenizers.

The pressure, temperature and time of hot calendering or pressing the rubber hydrochloride impregnated sheets may be varied widely. Rubber hydrochloride may be fluxed or flowed even in the interior of the paper at pressures and temperatures so low that there is no damage to the fibres. With heat stabilized amorphous asymmetrical rubber hydrochloride a pressure of 500 lbs. per sq. in. for three minutes at 240° F. gives satisfactory results. With shorter time of contact such as is obtained during a calendering operation, higher temperatures such as 280° F. to 300° F. may be used. With the saturated crystalline rubber hydrochlorides even higher temperatures are advisable, as for example 280° F. for three minutes, or 310° F. for one minute or less.

The following examples will illustrate my invention:

Example I

An impregnating solution of the following composition is made:

| | |
|---|---|
| Amorphous asymmetrical rubber hydrochloride | 10 |
| Magnesium oxide | 1 |
| Hexamethylene tetramine | 0.2 |
| Toluene | 100 |

Kraft paper is impregnated with the above solution, the solvent evaporated, and the sheet run between smooth, highly polished calender rolls at 280° F. A high gloss, flexible sheet free from pin holes is obtained having, with paper of ordinary thickness, about 20% of rubber hydrochloride.

Example II

Another impregnating formula is:

| | |
|---|---|
| Crystalline saturated rubber hydrochloride | 10 |
| Ester gum (glyceryl abietate) | 5 |
| Magnesium oxide | 1 |
| Hexa | .2 |
| Xylol | 80 |

Sulphite paper is impregnated with the above solution, the solvent evaporated and the sheet pressed with highly polished mold plates at 500 lbs. per sq. in. pressure at 300° F. for three minutes.

Example III

Transparent flexible composite sheets may be made as follows:

100 parts of amorphous rubber hydrochloride are milled with 10 parts of magnesium oxide, 2 parts of hexa, and the milled mixture dispersed in toluol to form a 20% solution. Kraft paper is impregnated with this solution, and the solvent evaporated. If necessary two or more coats are given until the percentage of dry rubber hydrochloride in the paper is about 33% or more. The sheets are subjected to heat and pressure sufficient to uniformly flow the rubber hydrochloride. With this high concentration of rubber hydrochloride a pressure of 500 lbs. per sq. in. and temperature of 240° F. for three minutes gives a transparent flexible sheet.

It is to be understood that the above examples are merely illustrative and in no way restrict the invention to the specific details therein set forth. Obviously the concentration of the impregnating solution may be varied and as the concentration is varied the ratio of rubber hydrochloride to paper is varied with consequent change in characteristics of the sheet such as transparency, and moisture proofness. Furthermore pressure, temperatures and time of molding or calendering may be varied, it being apparent that increased transparency and homogeneity is attained at higher temperatures, and pressures and longer time, care, however, necessarily being taken that the fibres are not injured or the rubber hydrochloride excessively decomposed.

I claim:

1. The improvement in the art of making a heat sealable, flexible sheet material free from pin holes which comprises subjecting paper impregnated with a rubber hydrochloride to heat and pressure sufficient to flow the rubber hydrochloride and produce a surface glaze.

2. The improvement in the art of making heat sealable, flexible sheet material free from pin holes which comprises subjecting paper impregnated with a rubber hydrochloride and a heat stabilizer therefor to heat and pressure sufficient to flow the rubber hydrochloride and produce a surface glaze.

3. The improvement in the art of making heat sealable, flexible sheet material free from pin holes which comprises impregnating a paper sheet with a mixture including a rubber hydrochloride, magnesium oxide, and a volatile solvent for the rubber hydrochloride, evaporating the volatile solvent, and contacting a surface of the impregnated sheet with a highly polished hard surface at a temperature and pressure sufficient to flow the rubber hydrochloride.

4. Thin flexible sheet material free from pin holes comprising paper impregnated with a rubber hydrochloride and having a high gloss surface including a rubber hydrochloride.

5. Thin flexible sheet material free from pin holes comprising paper impregnated with a mixture containing a rubber hydrochloride and a heat stabilizer, and having a high gloss surface glaze comprising a rubber hydrochloride and a heat stabilizer.

6. The method of making heat sealable, flexible sheet material free from pin holes which comprises impregnating a paper sheet with a stabilized amorphous rubber hydrochloride dispersed in a volatile solvent, evaporating the volatile solvent, and subjecting the sheet to heat and pressure sufficient to flow the rubber hydrochloride throughout the interstices of the paper and over the surface of the paper in a continuous film.

HERBERT A. WINKELMANN.